Patented May 5, 1936

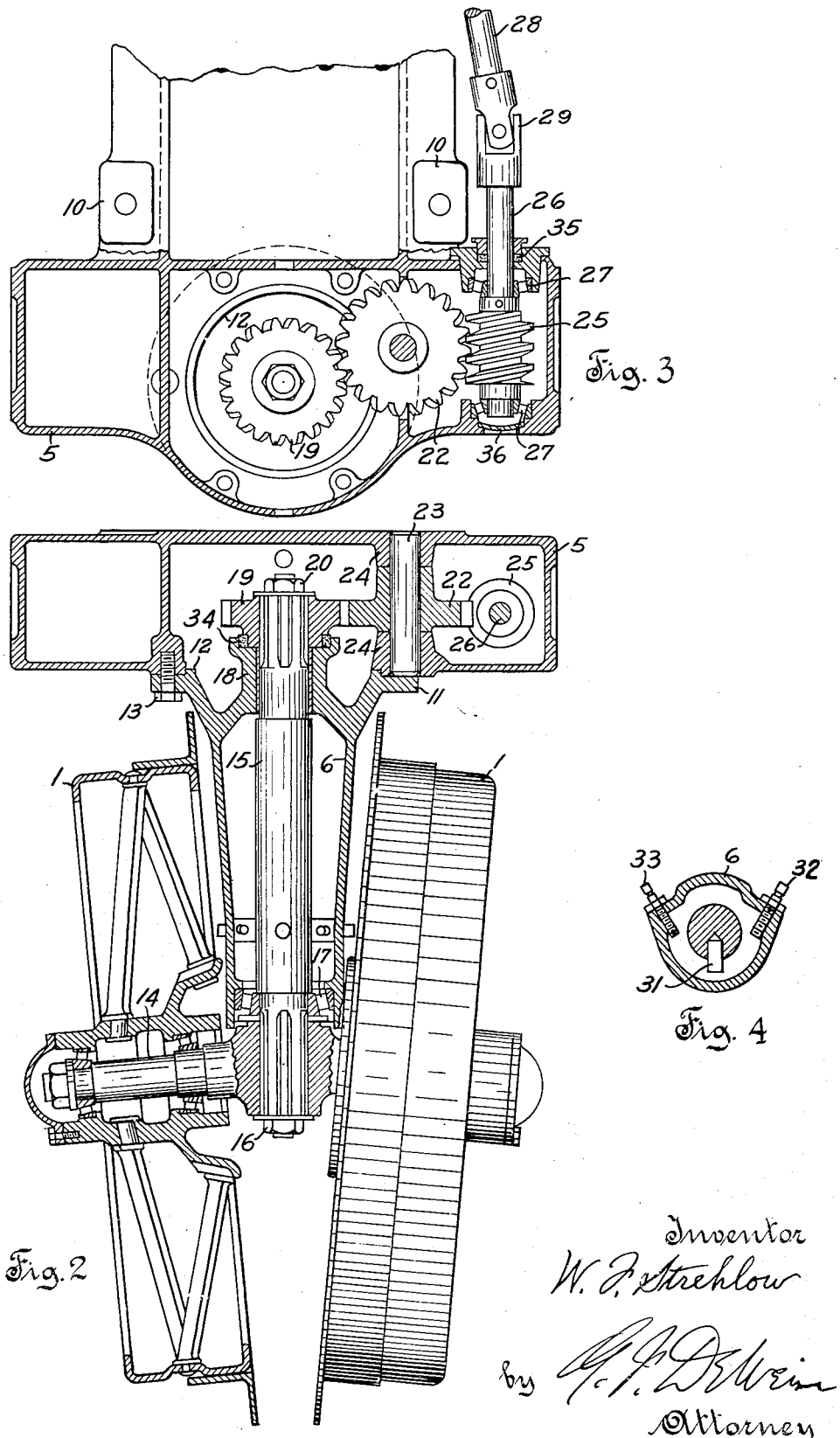

2,039,749

UNITED STATES PATENT OFFICE 2,039,749

STEERING MECHANISM FOR MOTOR VEHICLES

Walter F. Strehlow, Milwaukee, Wis., assignor to Allis-Chalmers Manufacturing Company, Milwaukee, Wis., a corporation of Delaware Original application November 24, 1930, Serial No. 497,854. Divided and this application October 8, 1931, Serial No. 567,582

1 Claim. (Cl. 280—87)

This invention relates to a steering mechanism for motor vehicles, for instance of the type disclosed in U. S. Patent 1,868,474, the present application being a division of the application which has resulted in the grant of said patent.

In motor vehicles of various types, including farm tractors, one of the requirements which have arisen in recent times and which is now outstanding, is that the vehicle be designed with a view to mass production. In this connection it is of the utmost importance that the various parts or units which make up the entire vehicle be not only of a thoroughly reliable construction but also that they can be produced and incorporated in the vehicle with a minimum of cost. It is an object of the invention to provide a steering mechanism for motor vehicles, which meets these requirements satisfactorily.

Another object of the invention is to provide a steering mechanism characterized by compactness and simplicity of construction and yet entirely satisfactory for use on farm tractors which have a centrally positioned front steering truck, an engine behind said truck, and which are powered to be driven at relatively high speeds, such as 20 miles per hour, or more.

These and other objects and advantages of the invention will be apparent from the following description. A clear conception of an embodiment of the invention and of the operation of a device constructed in accordance therewith, may be had by referring to the drawings accompanying and forming a part of this specification in which like reference characters designate the same or similar parts in the several views.

Fig. 2 is an end view, partly in section, of the front supporting and steering device shown in Fig. 1;

Fig. 3 is a sectional top view of the front supporting and steering device shown in Fig. 1; and Fig. 4 is a horizontal section through the tubular part of the front supporting device, showing adjustable stops to limit the steering movement of the front wheels.

Figure 1:
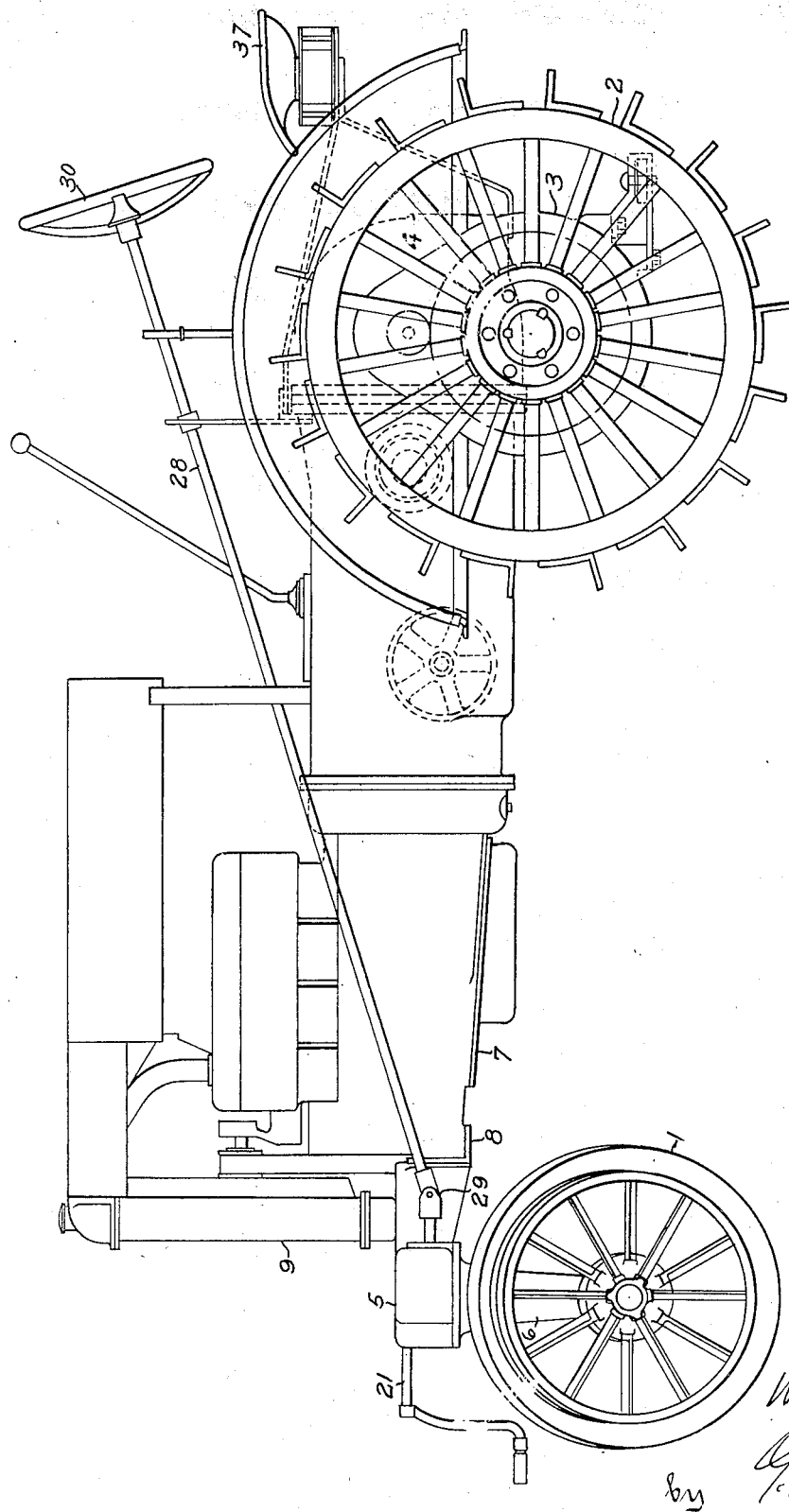
Fig. 1 is a side elevation of a cultivator tractor having a front supporting and steering device embodying the invention.

The cultivator tractor shown in Fig. 1 is of what is known as the frameless type, the motor crank case, the transmission casing and the differential housing forming a rigid structure which is supported by front wheels 1 and rear wheels 2. In accordance with the particular kind of work for which the tractor is intended its ground clearance, that is, the distance from the ground to the bottom of the main body is higher than in an ordinary, all purpose, tractor. This result has been accomplished by providing particular supporting means for the front and rear wheels. The rear wheels 2 are mounted on final drive gear casings 3, and their axis of rotation, as will be seen, is disposed substantially below the transverse axis of the differential housing which is indicated, generally, by the numeral 4.

The front end of the tractor is supported by a steering truck comprising an upper hollow casing 5, a downwardly extending tubular casing or spindle guide 6 and the wheels 1 which are disposed closely adjacent to each other as clearly shown in Fig. 2. The casing 5 extends forwardly from the lower portion of the crank case 7 of the usual internal combustion motor and has a rearwardly projecting extension 8 detachably secured to the bottom of the motor crank case 7. A vertical front portion of the motor crank case and a vertical rear portion of the casing 5, as indicated in Fig. 1, are also detachably secured to each other. The upper horizontal portion of the casing 5 affords a seat for the radiator 9 of the tractor, pads 10 (Fig. 3) being provided with holes to receive mounting bolts of the radiator. The tubular casing 6 has an upper flange 11 and a circular shoulder 12 projecting therefrom into a circular opening in the bottom of the casing 5. A series of bolts 13 is provided to hold the flange 11 secured to the bottom of the casing 5.

The closely adjacent front wheels 1 are rotatably mounted on an axle 14 which has a central hub portion splined on the lower end of a vertical steering spindle 15 and retained thereon by means of a nut 16. Fitted to the spindle 15 above the central hub portion of the axle 14 is the inner race of a conical roller bearing 17 whose outer race is fitted to the lower end of the tubular casing 6. The steering spindle 15 is journaled at the upper end of the spindle guide 6 in a bearing portion 18 and extends therethrough into the hollow casing 5. A toothed gear 19 is splined on the end of the spindle 15 projecting from the bearing portion 18, and a nut 20 screwed upon a threaded portion of the spindle 15 serves to retain the toothed gear 19 thereon. The steering spindle 15 is positioned centrally in front of the motor and its upper end is spaced from the top wall of the casing 5 so that a motor starting crank 21 may extend clear through the casing without interference with the vertical spindle 15. The toothed gear 19 meshes with a worm gear 22 which is rotatably mounted on a vertical shaft 23 whose ends are secured in suitable lugs 24 formed on the inner sides of the top wall and of the bottom wall of the casing 5. A worm 25 meshing with the worm gear 22 is securely mounted on a horizontal worm shaft 26 which is rotatably supported within the casing 5 by means of conical roller bearings 27. These bearings are arranged so as to take up axial thrust of the worm shaft in both directions. The rear portion of the worm shaft projects through the rear wall of the casing 5 and is connected to a steering column 28 by means of a universal joint 29. The rear end of the steering column 28 is positioned about centrally between the rear wheels 2 above the differential housing 4, and its axis is horizontally as well as vertically inclined with respect to the axis of the worm shaft 26. The axis of the worm shaft 26 is spaced from the axis of the steering spindle 15 for a sufficient distance horizontally so that the rearwardly elongated axis of the worm shaft 26 does not run into a portion of the crank case 7 immediately behind the casing 5, which arrangement provides for clearance between the forward part of the vertically and horizontally inclined steering column and the motor. In other words, the motor occupies a space between the rearwardly elongated axis of the worm shaft 26 and a plane through the axis of the steering spindle 15, parallel to said worm shaft axis, and the forward part of the steering column clears the motor at the side of the latter adjacent to the axis of the worm shaft 26. The worm 25, worm gear 22 and toothed gear 19 afford a simple and efficient means for transmitting rotary movement from the worm shaft 26 to the steering spindle 15 at a suitable and desirable ratio of transmission. A hand wheel 30 is secured to the rear end of the steering column, and it will be understood that turning this hand wheel to the right (looking from the operator's seat 37), will cause the worm 25 to rotate the worm gear 22 in Fig. 3, in an anticlockwise direction, while the toothed gear 19 and with it the spindle 15 will be rotated in a clockwise direction. As the axle 14, carrying the front wheels 1, is fixed to the lower end of the vertical spindle 15 the described clockwise movement of the latter will cause the front wheels to swing to the right, and thus the tractor will be steered in that direction. The angle through which the spindle 15 may be turned is limited by a stud 31 (Fig. 4), which projects from the spindle 15 and cooperates with either one of the set screws 32 or 33 which are held in a suitable position in the tubular casing 6.

Referring again to Figs. 2 and 3 it should be noted that the worm 25 occupies approximately the same position relative to the steering spindle 15 which it would occupy if the gear wheel 19 were enlarged to such a diameter and otherwise properly modified so as to cooperate directly with the worm 25. In other words, the worm 25 is mounted on the worm shaft 26 adjacent to the point of the worm shaft axis which has the shortest distance from the axis of the spindle 15, and the gear wheel 19, on the other hand, is mounted on the spindle 15 adjacent to the point of the spindle axis which has the shortest distance from the axis of the worm shaft 26. It will be understood, however, that the transmission gearing including the worm 25, worm gear 22 and toothed gear 19 differs in various respects from the case just referred to in which the gear wheel 19 was assumed to cooperate directly with the worm 25. In the first place, if the pitch of the worm 25 were left unchanged and the toothed gear 19, secured to the spindle 15, were made large enough and otherwise properly modified to cooperate directly with the worm 25, then the mechanism would be such as to make it necessary to turn the hand wheel 30 a relatively great number of times before the ground wheels 1 would be turned from their straight ahead position into the extreme position towards the left or right, whereas with the mechanism as shown in Figs. 2 and 3 only relatively few turns of the hand wheel 30 are necessary to turn the ground wheels through the same angle. This should be obvious from the fact that, with the same pitch of the worm, the ratio of transmission between the worm shaft 26 and the spindle 15 is much higher in the mechanism as shown, than it would be if the toothed gear 19 were made to cooperate directly with the worm 25.

Further, it should be noted that the toothed gear 19 would have to be modified not only as to its pitch diameter but also as to the arrangement of its teeth in order to make it cooperate with the worm 25. As shown in Figs. 2 and 3, the teeth of the toothed gear 19 cooperate with the teeth of the worm gear 22 whose teeth, in turn, cooperate with the threads of the worm 25, the teeth of the worm gear 22, according to conventional worm gear design, being set at an angle, as on a spiral gear, to insure proper mesh with the worm 25. The gear 19, in order to properly mesh with the worm gear 22, therefore, likewise has its teeth set at an angle, as on a spiral gear, but the teeth at the side of the gear 19 facing the worm 25 are inclined in a direction opposite to the inclination which would be required for proper cooperation with the threads of the worm. The gear 19, although being itself a spiral gear whose teeth are set at an angle corresponding, as to the number of degrees, to the helix angle of the worm, could not be made to mesh with the worm 25 by merely increasing its pitch diameter, but it would further be necessary to reverse the inclination of the teeth of the gear 19.

The worm 25 and the gears 19 and 22 are preferably immersed in lubricant, and the upper end of the tubular casing 6 is designed so as to seal the opening in the bottom of the casing 5. A packing 34 seals the joint between the bearing portion 18 and the toothed gear 19. Another packing 35 is provided to seal the joint between the worm shaft 26 and the rear wall of the casing 5. Egress of lubricant at the front end of the worm shaft 26 is preferably prevented by a spring washer 36.

The steering truck including the upper casing 5, the tubular casing 6, and the front wheels 1, as will be seen, may easily be removed as a unit from the tractor, and another steering truck of well known design may be used in connection with the same main body of the tractor.

It should be understood that it is not intended to limit the invention to the exact details of construction herein shown and described, for various modifications within the scope of the claims may occur to persons skilled in the art.

It is claimed and desired to secure by Letters Patent:

In a vehicle, dirigible front wheels, a casing above the axes of said wheels, steering means for said wheels, including a substantially vertical steering spindle having a portion projecting into said casing, a worm shaft rotatably mounted in said casing on an axis non-coplanar with the axis of said steering spindle, a worm element within said casing positioned on said worm shaft adjacent to the point of the axis of the latter which has the shortest distance from the axis of said steering spindle, a worm wheel within said casing cooperating with said worm at the side thereof facing said steering spindle, said worm wheel having a diameter less than the shortest distance between the axis of said steering spindle and the axis of said worm shaft, a toothed gear within said casing positioned on said steering spindle adjacent to the point of the axis of the latter which has the shortest distance from the axis of said worm shaft, the teeth of said toothed gear cooperating with the teeth of said worm wheel, a motor occupying a space behind said casing between the axis of said worm shaft and a plane through the axis of said steering spindle parallel to said worm shaft axis, and a steering column, having a forward end connected to said worm shaft, said steering column clearing said motor at the side of the latter adjacent to the axis of said worm shaft.

WALTER F. STREHLOW.